UNITED STATES PATENT OFFICE.

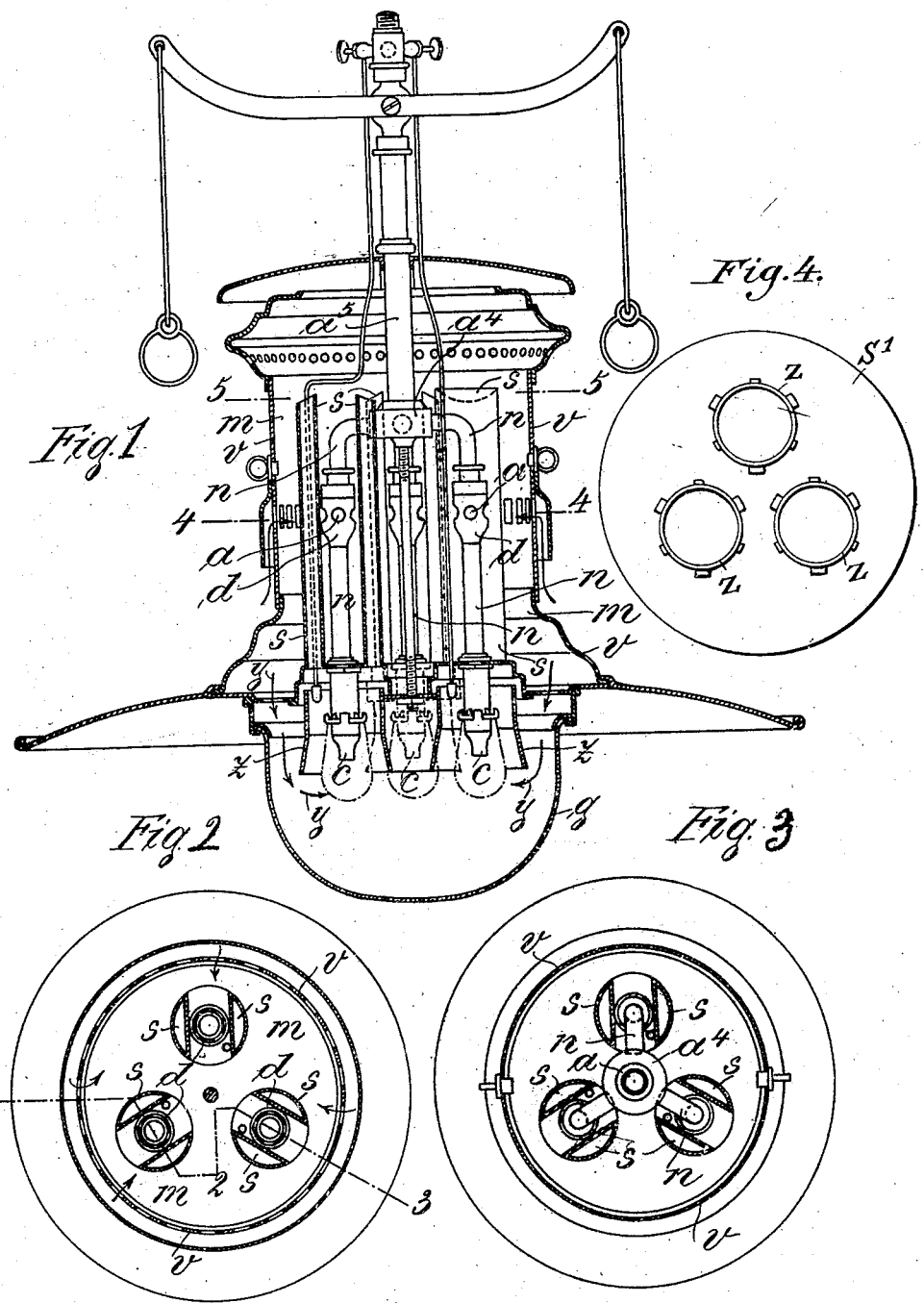

MAX GRAETZ, OF BERLIN, GERMANY.

LAMP WITH INVERTED INCANDESCENT GAS-BURNERS.

No. 884,816.

Specification of Letters Patent.

Patented April 14, 1908.

Application filed February 28, 1906. Serial No. 303,519.

*To all whom it may concern:*

Be it known that I, MAX GRAETZ, a subject of the King of Prussia, German Emperor, and resident of 92–93 Elsenstrasse, Berlin, Kingdom of Prussia, German Empire, have invented certain new and useful Improvements in Lamps with Inverted Incandescent Gas-Burners, of which the following is an exact specification.

My invention relates to such lamps which are protected against air-draft and are provided with inverted incandescent gas-burners.

In order to make my invention clear, I refer to the accompanying drawing which shows the same in two modifications.

Figure 1 shows an arrangement of three burners within a common glass-globe in a vertical section, Fig. 2 is a horizontal section on the line 4—4 of Fig 1, Fig. 3 is a horizontal section on the line 5—5 of Fig. 1. Fig. 4 is a fragmentary plan illustrating the manner of attaching the cylindrical transparent tubes used in connection with this invention to the lamp.

Referring to the figures $c\ c$ are the mouth-pieces of the Bunsen-burner $d\ d$ the mantles being attached to them in the common manner. Each mantle and burner is surrounded by a transparent tube or cylinder $z$, the upper openings of these cylinders being in connection with two or more chimneys $s\ s$. The attachment of the transparent cylinders to the chimneys takes place as follows: $s'$ is a bottom plate having in this example of construction three central openings leaving the upper end of the transparent glass cylinder $Z$ to pass. To this end in the bottom plate recesses are provided which are in communication with the corresponding central openings and the top edge of each glass cylinder is fitted with a corresponding number of lugs which are adapted to pass through the said recesses. After their passing the glass cylinders are turned somewhat round to disengage the recesses and the lugs, so that the glass cylinders are prevented from being detached from the bottom plate. These chimneys are so arranged and so shaped that the Bunsen burner tube $n$ is isolated and protected against the heating influences of the combustion gases by an intermediate air-space. The Bunsen-burner tube $n$ is provided with the openings $a$ for the inlet of the primary air to the nozzle. The burner tubes $n$ are bent above the air-inlet openings $a$ inwards to the midst of the lamp and are attached to a chamber $a^4$ which is in connection with a central gas tube $a^5$.

The mantles $d\ d$ are surrounded by the transparent globe $g$ and the whole burner is surrounded by a casing $v$ which is constructed in the manner as usual in such lamps which are under the influence of the currents of the atmospheric air.

The primary air entering the holes $a$ of the Bunsen-burner tube $n$ as well as the secondary air for the burner mantle is taken from the inner space $m$ of the casing $v$ which communicates with the atmosphere by openings in the middle of the casing $v$. As the chimneys open freely into the upper part of the space $m$ the air is allowed to flow partially into the chimneys, whereas the lower part of the casing $v$ shows a current of air in downward direction; the air in the interior of the casing $v$ is in a continuous motion and therefore the influence of the atmospheric air and the currents of the atmospheric air are in a great measure diminished. It is clearly to be seen that the nozzles of the Bunsen-burner as well as the mixing-chamber $a^4$ are perfectly protected against the influence of heat of the combustion gases.

Having thus fully described the nature of my invention, what I desire to secure by Letters Patent of the United States is:—

1. A lamp arrangement for inverted incandescent gas light, comprising in combination a plurality of Bunsen-burners and several chimneys provided with special exhaust channels and adapted to receive the Bunsen-burners, incandescent mantles secured to the lower end of the Bunsen-burner, a transparent glass cylinder surrounding the incandescent mantles, and carried by the lower end of the chimneys, a casing provided with inlet openings for the combustion- and mixing-air, and open at its top end, and a globe closing air-tightly the bottom-end of the casing.

2. A lamp arrangement for inverted incandescent gas light, comprising in combination three Bunsen - burners circularly arranged, three chimneys provided with special segmentally shaped exhaust channels, leaving an interstice for locating therein the Bunsen burners, incandescent mantles and mouth-pieces ($c$) both secured to the bottom end of the Bunsen-burner, a transparent glass-cylinder secured to the bottom-end of the chimneys and surrounding the incandescent mantles, a casing provided with air inlets in its middle part and in communication with the top end of the chimneys, and a globe closing air-tightly the lower end of the casing.

3. A lamp arrangement for inverted incandescent gas light, comprising in combination a plurality of burner tubes, a supply-receptacle for the gas arranged in the axis of the lamp and in communication with the Bunsen-burners, a plurality of chimneys provided with special exhaust channels and adapted to receive the Bunsen-burners, incandescent mantles secured to the lower end of the Bunsen-burners, a transparent glass cylinder surrounding the incandescent mantles and carried by the lower end of the chimneys, a casing provided with inlet openings for the combustion- and mixing-air, and open at its top end, and a globe closing air-tightly the bottom end of the casing.

4. A lamp arrangement for inverted incandescent gas light, comprising in combination three Bunsen burners, circularly arranged, a supply receptacle for the gas arranged in the axis of the lamp and in communication with the Bunsen-burner, three chimneys provided with special segmentally shaped exhaust channels leaving an interstice for locating therein the Bunsen-burners, incandescent mantles and mouth-pieces (c) both secured to the bottom end of the Bunsen-burners, a transparent glass-cylinder secured to the bottom end of the chimneys and surrounding the incandescent mantles, a casing provided with inlet openings in its middle part and in communication with the top end of the chimneys, and a globe closing air-tightly the lower end of the casing.

In witness whereof I have hereunto set my hand in the presence of two witnesses.

MAX GRAETZ.

Witnesses:
 WOLDEMAR HAUPT,
 HENRY HASPER.